Re-issue. E. G. Otis Impt. in Hoisting Apparatus. Reissued Feb 21 1871

Drawing C. Sheet 1. Assigned to Otis Brothers & Co.

4271

Witnesses:
Fred Haynes
R. R. Rabeau

Otis Bros & Co
Chas R. Otis Pres
John L. Hubbard

Division C Sheet 11 — L. G. Otis Impt in Hoisting Apparatus.

Assigned to

Otis Brothers & Co.

Witnesses:
Fred Haynes
R. A. Rabeau

Otis Bros & Co
Chas. R. Otis Pres
John L. Hubbard

United States Patent Office.

OTIS BROTHERS & COMPANY, OF YONKERS, NEW YORK, ASSIGNEES OF E. G. OTIS, DECEASED.

Letters Patent No. 124, dated January 15, 1861; reissue No. 4,271, dated February 21, 1871

DIVISION C.

IMPROVEMENT IN HOISTING APPARATUS.

The Schedule referred to in these Letters Patent and making part of the same.

*To all whom it may concern:*

Be it known that E. G. OTIS, deceased, of Yonkers, in the county of Westchester and State of New York, invented a new and useful Improvement in Hoisting Apparatus, for which he obtained Letters Patent No. 124, dated January 15, 1861, of which OTIS BROTHERS & COMPANY, a joint stock company incorporated under the laws of the State of New York, are now the owners; and we, CHARLES R. OTIS, president, and JOHN L. HUBBARD, secretary of the said company, do hereby declare that the following is a full, clear, and exact description of the same, reference being had to the accompanying drawing forming part of this specification, in which—

Similar letters of reference indicate corresponding parts in the several figures.

Figure 1:
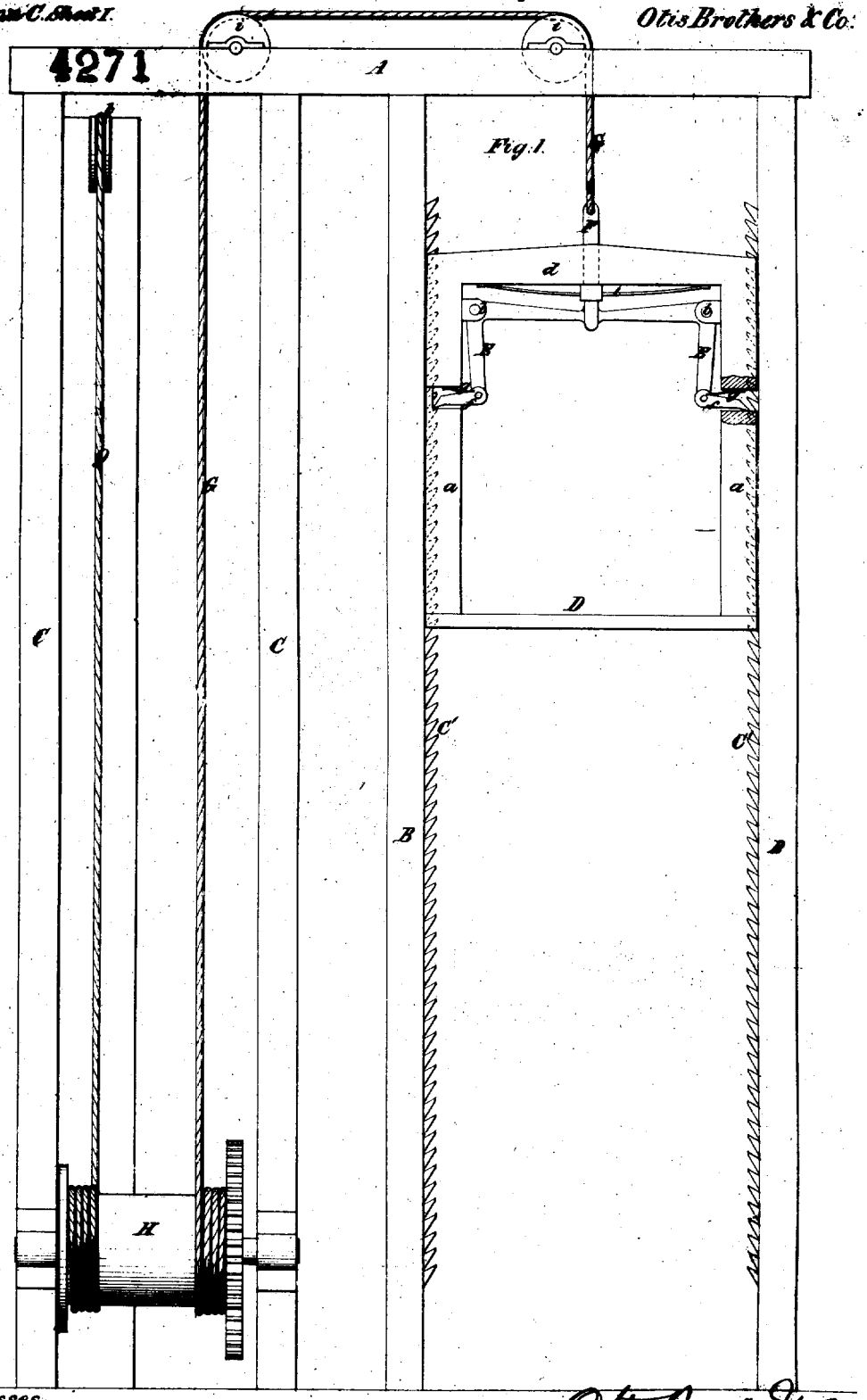
Figure 1 is a front elevation of those parts of a hoisting apparatus which are necessary to illustrate this improvement.
Figure 2:
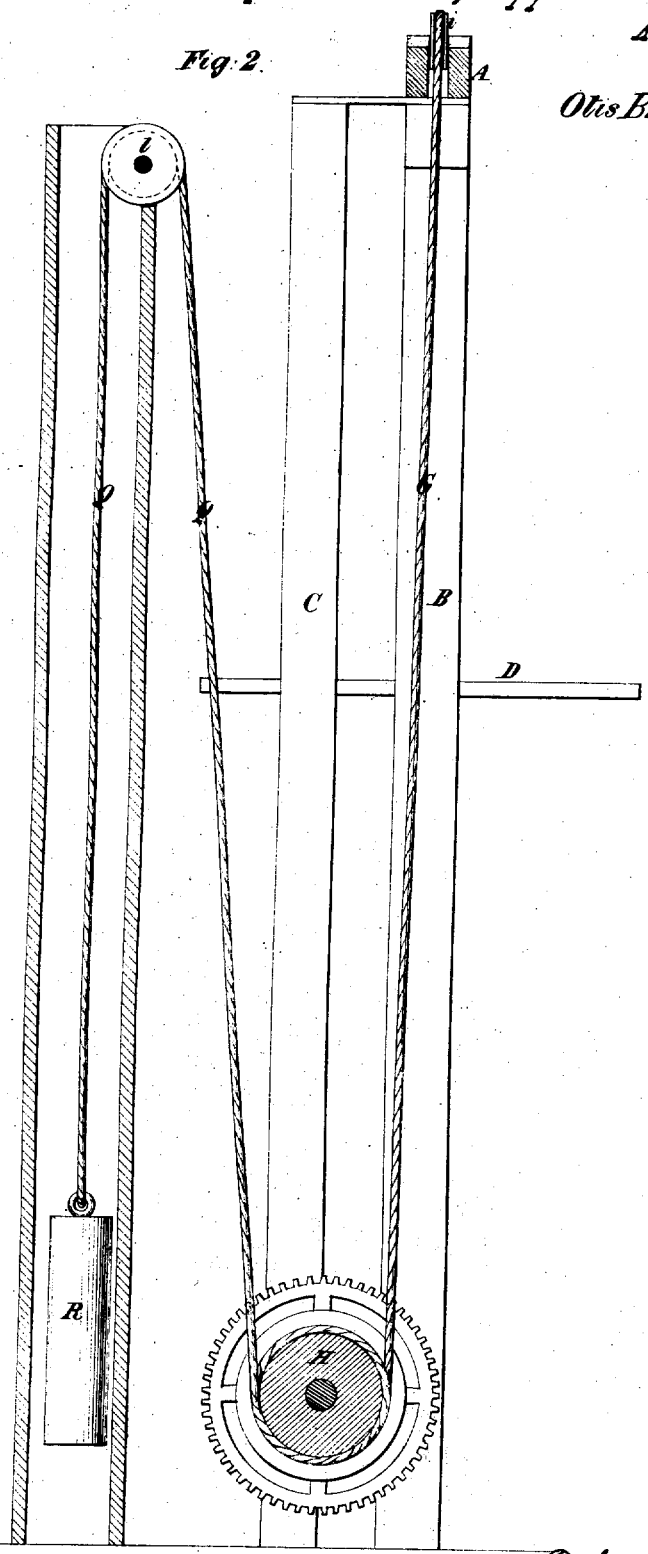
Figure 2 is a vertical section of the same at right angles to fig. 1.

This improvement consists in the combination of a counterpoise to the hoisting-platform or cab, though the intervention of the hoisting-drum, with safety-stop mechanism attached to the platform or cab for the purpose of stopping the descent of the latter in case of the breaking of the rope which sustains the counterpoise, the object of such mode of combination being to better insure the action of the stop mechanism in case of the breaking of the counterpoise-rope.

To enable others skilled in the art to fully understand and apply this improvement, we will proceed to explain it with reference to the drawing.

A B C is the frame-work of a hoisting apparatus.

D is the platform or cab on or in which the load is raised and lowered, working between the uprights B of the framing, where it is suspended from the hoisting-rope G by means of a rod, F, passing loosely through its upper rail *d*, and a spring, *e*, under the said rail.

The hoisting-rope passes over pulleys *i i* to the hoisting-drum H, with which it is connected.

E E *b b f f g g* C′ C′ is the safety-stop mechanism, consisting of ratchet-toothed racks C′ C′ attached to the uprights B B, elbow-levers E E attached by fulcrum-pins *b b* to the sides of the platform or cab, pawls *f f* attached to the lower ends of the said levers, and springs *g g* exerting a downward or outward pressure upon the said pawls, the upper ends of the said levers being connected at *c* with the lower end of the rod F.

The tension exerted on the rope G by the weight of the platform or cab while the hoisting apparatus is in proper operation, causes it, through the rod F and levers E, to draw the pawl out of the racks; but as soon as the rope is relieved of tension from any cause, the spring *e* presses down the rod F and throws the pawls into the racks, thereby preventing the descent of the platform or cab.

R is the counterpoise, consisting of a weight suspended from a rope, Q, which runs over a suitably arranged pulley, *l*.

The counterpoise-rope Q and hoisting-rope G are connected with the hoisting-drum H, to wind thereon in opposite directions, so that the counterpoise acts upon the platform or cab through the said drum with the same counterbalancing effect as though connected with it directly by its rope Q, without the intervention of the hoisting-drum; but by the interposition or intervention of the hoisting-drum in connection with the safety-stop mechanism of the platform or cab, the counterpoise is prevented from interfering with the action of said mechanism by taking the weight of the platform or cab off the spring *e*, as it does when the counterbalance is directly connected with the platform or cab by a rope distinct from the hoisting-rope.

What is here claimed, and desired to be secured by Letters Patent, is—

The counterpoise, combined with the safety-stop mechanism of the platform or cab through the intervention of the hoisting-drum, substantially as and for the purpose herein set forth.

CHAS. R. OTIS,
*Prest.*
JOHN L. HUBBARD
*Secy*

Witnesses:
FRED. HAYNES,
R. E. RABEAU.